Aug. 14, 1962

L. ADELSON ET AL 3,049,651

ELECTRICAL CAPACITORS

Filed Oct. 29, 1959

LEONARD ADELSON
ALI M. ALLMAKER
*INVENTORS*

BY *Connolly and Hutz*

THEIR ATTORNEYS

3,049,651
ELECTRICAL CAPACITORS
Leonard Adelson and Ali M. Allmaker, Williamstown, Mass., assignors to Sprague Electric Company, North Adams, Mass., a corporation of Massachusetts
Filed Oct. 29, 1959, Ser. No. 849,603
5 Claims. (Cl. 317—258)

The present invention relates to improved electrical capacitors. More particularly, the invention relates to electrostatic capacitors which have an adjusted or predetermined temperature coefficient of capacitance for use at a certain specified operating temperature or specified operating temperature range.

In the extensive use of capacitors today in electronically controlled missiles, computer circuits, etc., it is a definite advantage to have capacitors which are especially suited for use under a definite operating temperature or temperature range.

The circuit designer or fabricator is usually able to predetermine the operating temperature at certain points in the circuit at which capacitors are required. These temperature ranges may vary at different points within the circuit. It is advantageous to the designer or fabricator to be able to utilize a capacitor designed especially for use at these operating ranges of temperature.

It is therefore an object of the present invention to provide novel and improved capacitors which have predetermined or adjusted temperature coefficients of capacitance for use at definite operating temperatures.

Still another object of the invention is to provide novel and improved convolutely wound resin film type capacitors having predetermined or adjusted temperature coefficients of capacitance for use at definite operating temperatures.

Figure 1:
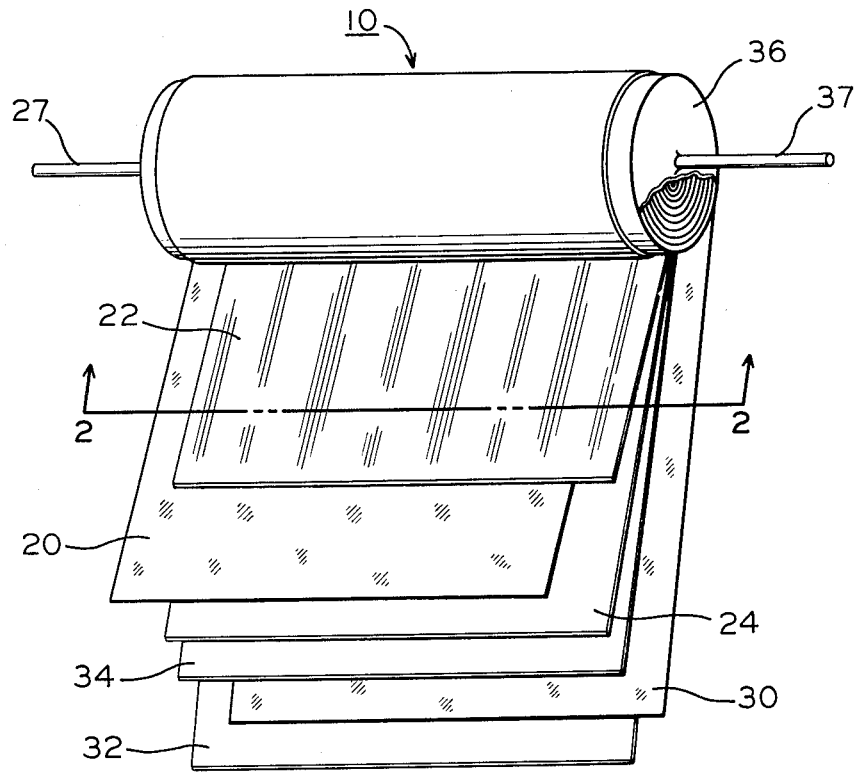
Figure 2:
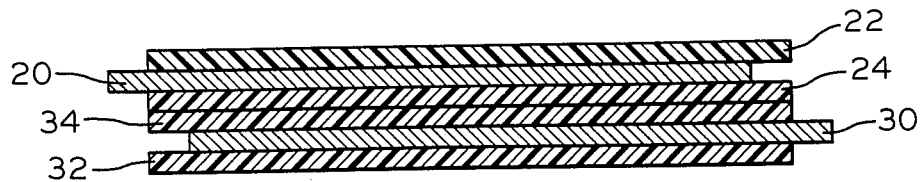

Additional objects will be apparent from the following description of the invention taken together with the accompanying drawing, in which:

FIG. 1 is a perspective of a partially unrolled capacitance section constructed in accordance with this invention; and FIG. 2 is a cross-section taken in the direction of the arrows along line 2—2 in FIG. 1.

In accordance with the present invention, there is provided a resin film capacitor comprising convolutely wound electrode elements which are separated by resin film dielectric spacing material. In the present invention, the dielectric material preferably consists of a plurality of continuous layers of polyvinylhydrocarbon film in addition to a single layer of linear polyester film. In particular, the hydrocarbon film is preferably a polystyrene film, while the polyester film is preferably a polyethylene terephthalate film. In the finished capacitor the polystyrene film is preferably disoriented, while the polyethylene terephthalate film is substantially oriented.

The objects of the invention are achieved by utilizing the opposite temperature coefficient of capacitance characteristics of polystyrene and polyethylene terephthalate. Partial compensation is obtained when both films are used as dielectric. The resulting temperature coefficient of capacitance is a function of the ratio of the volumetric amount of polystyrene to terephthalate film used. In the preferred embodiment of this invention the single layer of polyethylene terephthalate has a smaller volume than any of the plurality of layers of polystyrene. However, the concept of the invention is embodied in a construction wherein the single terephthalate film occupies less space between the capacitive overlap of the electrodes than the space occupied by the total polystyrene.

A predetermined or adjusted temperature coefficient of capacitance is achieved in accordance with this invention by varying the length of polyethylene terephthalate film with respect to the length of polystyrene films. The same result is obtained by varying the thickness of the polyethylene terephthalate film with respect to the total thickness of the polystyrene films. The same effect is also achieved by varying the width of the polyethylene terephthalate film with respect to the width of the styrene films used in the capacitor. In addition, the same effect is achieved by using disconnected small pieces of the terephthalate film in the capacitor windings instead of the continuous film.

No matter which of the three basic variations is employed (i.e., thickness ratio, length, or width) it has been found that superior results are obtained by winding the capacitance section so that the dielectric between one set of opposed faces of the electrodes is solely polystyrene films, and the dielectric between the other two faces of the electrodes is polystyrene with at least a portion of polyethylene terephthalate. In this manner, the effective dielectric on one electrode is polystyrene, while the effective dielectric on the other electrode is polystyrene plus polyethylene terephthalate. By maintaining one electrode between polystyrene films while at least a portion of the other electrode is under the influence of a polyethylene terephthalate film, results are attained that are beyond the scope of the outstanding contribution to the art by Preston Robinson and David B. Peck that is described in U.S. Letters Patent 2,749,490.

Notable among the results that distinguish the present invention are the smaller units achieved because of the greater capacity per unit volume attained by virtue of the increase in volumetric ratio between the different films, while reducing overall size, that is obtained in the structural embodiments of this invention.

As shown in FIGS. 1 and 2 of the drawing, capacitance section 10 comprises convolutely wound electrode foils 20 and 30 having oppositely disposed extensions according to conventional extended-foil construction. Foils 20 and 30 are separated by resin films that are so arranged that electrode 20 is between a film 22 of polyethylene terephthalate and a film 24 of polystyrene, and electrode 30 is between two films 32 and 34 of polystyrene. As is shown more fully in the sectional view of FIG. 2, two polystyrene films 24 and 34 provide the separation between two opposed faces of the electrodes, whereas the separation between the opposite faces of the electrodes is provided by polyethylene terephthalate film 22 and polystyrene 32.

In this regard it should be noted that the concept of this invention does not require the existence of both polystyrene layers 24 and 34, and that one of the preferred embodiments has only layer 24 between two opposed faces of electrodes 20 and 30. In a like manner, additional layers of polystyrene may be employed between either set of electrode faces. Another of the preferred embodiments utilizes two polystyrene layers between each set of electrode faces, with the single polyethylene terephthalate layer sandwiched between polystyrene.

The extended edges of electrodes 20 and 30 are provided with lead-wires 27 and 37, respectively, by means of conventional solder terminations such as shown in break-away fashion at 36 in FIG. 1. In this regard, it should be understood that the extended foil construction shown in the drawing is the preferred embodiment of this invention; however, the invention is suitable of use in the tab-wound constructions that are well-known to the art.

In the preferred embodiment of this invention, electrodes 20 and 30 are of high purity aluminum foil, although it should be understood that lead-tin alloy foil is suitable for this invention. In place of polystyrene films, other suitable films such as polyalphamethylstyrene, polyvinyltoluene, polyethylene, polypropylene, and similar films may be used. In addition, substituted hydrocarbon polymers such as polytetrafluoroethylene or polytrifluorochloroethylene may be used. Polymer films which may be used in place of the terephthalate film include polyamides, polyurethanes, and polycarbonates. It should be noted that the insulation resistance, dielectric absorption, and other electrical characteristics of the polyester film and its substitutes need not be of the same order of magnitude as that of the polystyrene film.

It should be pointed out that the drawing shows only one preferred embodiment of the invention. Actually to achieve other and varied predetermined temperature coefficients of capacitance, the volumetric amount of terephthalate film may be varied by making it shorter than the other films, or it may be thinner, or it may be narrower than the other films. Disconnected pieces of the terephthalate film may be used in spaced apart relationship between the other windings of the capacitor to provide a capacitor having a predetermined temperature coefficient of capacitance for a particular temperature or temperature range.

The following information regarding the temperature coefficient of capacitance of capacitors constructed in accordance with this invention was gathered from capacitors wherein the terephthalate film layer was shorter or equal in length to the length of the polystyrene layers used between the capacitive overlap of the electrodes. In other words, the terephthalate film was the same length or shorter than the length of the overlap of the electrode foils. For convenience in the rolling operation, all the dielectric ribbons were started together on the mandrel. Two turns of dielectric were wrapped around the mandrel before the electrode foils were interleaved with the dielectrics, and two turns of dielectric were wrapped after the entire foil length had been utilized.

The following examples are set forth to more fully disclose the invention. They should be understood to be illustrative only, and in no way defining a limitation of the scope of the invention.

A plurality of capacitance sections were rolled to give a capacitance of 0.1 mfd. with the following construction and arrangement of layers:

$\frac{1}{4}$ mil aluminum foil
$\frac{4}{10}$ mil polystyrene
$\frac{4}{10}$ mil polystyrene
$\frac{1}{4}$ mil aluminum foil
$\frac{4}{10}$ mil polystyrene
$\frac{1}{4}$ mil polyethylene terephthalate
$\frac{4}{10}$ mil polystyrene The capacitive overlap of the two $\frac{1}{4}$ mil aluminum foils was $\frac{5}{8}$" by 80"; hence the effective length of the polystyrene films was 80". In order to better illustrate the concept of predetermined or compensated temperature coefficient of capacitance some of the units were rolled with an effective length of polyethyleneterephthalate of $75\frac{1}{2}$"; others with effective length of 69", others with effective length of 55"; and still others with effective length of 44".

The successful attainment of the objectives of this invention is witnessed by the extremely low percentage change in capacitance exhibited by the capacitors of the preceding paragraph. The units with the effective polyethylene terephthalate length of $75\frac{1}{2}$" exhibited a percentage change in capacitance at $-40°$ C. of $+0.35$, and at $+65°$ C. a percentage change of $-0.3$. The units having effective polyethylene terephthalate of 44" show a change of $+0.66\%$ at $-40°$ C., and $-0.41\%$ at $+65°$ C.

Additional groups of capacitance sections were rolled wherein the polystyrene and polyethylene terephthalate films were of the same effective length and the thickness ratio between the single polyethylene terephthalate film and the plurality of polystyrene layers was different from the above stated examples. These units were rolled with the following construction and arrangements of layers:

$\frac{6}{10}$ mil polystyrene
$\frac{1}{4}$ mil aluminum foil
$\frac{4}{10}$ mil polystyrene
$\frac{1}{4}$ mil polyethylene terephthalate
$\frac{1}{4}$ mil aluminum foil The capacitive overlap of the two aluminum foils was $\frac{1}{2}$" x 65"; which yielded a capacitance of 0.062 mfd. These units showed a percentage change in capacitance of only $-.15$ at $-40°$ C., and $-.22$ at $+65°$ C.

An additional group of capacitors was rolled utilizing the same construction and arrangement of layers as that set forth in the preceding example, with the single exception that $\frac{1}{4}$ mil tin-lead alloy foil (83% tin) was used in place of the aluminum foil. These units showed a percentage change in capacitance of $-.29$ at $-40°$ C., and of $-.54$ at $+65°$ C.

It should be understood that although the invention has been described in terms of extended-foil (non-inductive) capacitor construction, it is within the scope of the invention to embody the concept in a tab-wound capacitor construction, wherein foils 20 and 30 would not extend beyond the dielectric layers, but would be provided with metallic tabs or risers that would provide the means for electrical connection beyond the ends of section 10.

It will be understood that the above-described embodiments of this invention are for purposes of illustration only, and that modificaitons thereof may be made without departure from the spirit of the invention. It is intended that this invention be limited only by the scope of the appended claims.

What is claimed is:

1. An electrostatic capacitor having a predetermined temperature coefficient of capacitance, said capacitor comprising convolutely wound electrodes separated by resin film dielectric layers, said electrodes and said layers being so arranged that one set of opposed faces of said electrodes is separated solely by polyvinylhydrocarbon film, and the opposite set of faces of said electrodes being separated by linear polyester film and a layer of polyvinylhydrocarbon film.

2. An electrostatic capacitor having a predetermined temperature coefficient of capacitance, said capacitor comprising convolutely wound electrodes separated by resin film dielectric layers, said electrodes and said layers so arranged that one of said electrodes is sandwiched between immediately adjacent layers of polystyrene film, and at least a part of another of said electrodes is sandwiched between a layer of polystyrene and a layer of polyethylene terephthalate.

3. The capacitor of claim 2 in which the polyethylene terephthalate is present in a smaller volumetric amount than the polystyrene.

4. An electrostatic capacitor according to claim 1 wherein the polyvinylhydrocarbon film is polystyrene, and the polyester film is polyethylene terephthalate.

5. An electrostatic capacitor according to claim 1 wherein the polyester film has a smaller volume than that of the polyvinylhydrocarbon film.

References Cited in the file of this patent

UNITED STATES PATENTS

| | | |
|---|---|---|
| 2,740,732 | Peck et al. | Apr. 3, 1956 |
| 2,749,490 | Robinson et al. | June 5, 1956 |
| 2,842,726 | Robinson et al. | July 8, 1958 |